United States Patent
Weil et al.

(10) Patent No.: US 11,459,263 B2
(45) Date of Patent: Oct. 4, 2022

(54) SELECTIVE CHEMICAL FINING OF SMALL BUBBLES IN GLASS

(71) Applicant: Owens-Brockway Glass Container Inc., Perrysburg, OH (US)

(72) Inventors: Scott Weil, Perrysburg, OH (US); Zhongming Wang, Ypsilanti, MI (US); Roger P. Smith, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 180 days.

(21) Appl. No.: 16/590,062

(22) Filed: Oct. 1, 2019

(65) Prior Publication Data

US 2021/0094856 A1    Apr. 1, 2021

(51) Int. Cl.

| | |
|---|---|
| C03B 5/225 | (2006.01) |
| C03B 5/235 | (2006.01) |
| C03C 1/00 | (2006.01) |
| C03C 3/078 | (2006.01) |
| C03C 3/087 | (2006.01) |
| C03C 3/112 | (2006.01) |

(52) U.S. Cl.
CPC ............ *C03B 5/225* (2013.01); *C03B 5/2353* (2013.01); *C03B 5/2356* (2013.01); *C03C 1/004* (2013.01); *C03C 3/078* (2013.01); *C03C 3/087* (2013.01); *C03C 3/112* (2013.01); *C03B 2211/23* (2013.01)

(58) Field of Classification Search
None
See application file for complete search history.

(56) References Cited

U.S. PATENT DOCUMENTS

| | | | | |
|---|---|---|---|---|
| 3,589,885 A | * | 6/1971 | Monks | ........................ C03C 1/02 65/134.3 |
| 3,885,945 A | * | 5/1975 | Rees | ........................ C03B 5/185 65/135.7 |
| 4,049,646 A | * | 9/1977 | Furkert | .................. C01B 17/504 540/535 |
| 4,110,097 A | * | 8/1978 | Chevallier | .............. C03B 5/173 65/134.3 |

(Continued)

FOREIGN PATENT DOCUMENTS

| | | |
|---|---|---|
| DE | 2347819.5 | 9/1973 |
| WO | 2015134315 A1 | 9/2015 |

OTHER PUBLICATIONS

Kim et al. effect of the furnace atmosphere on Eglass forming (Year: 2006).*

(Continued)

*Primary Examiner* — Jodi C Franklin

(57) ABSTRACT

A method of fining glass is disclosed that includes flowing a molten glass bath through a fining chamber. The molten glass bath has an undercurrent that flows beneath a skimmer that is partially submerged in the molten glass bath. One or more fining agents are introduced into the undercurrent of the molten glass bath directly beneath the skimmer from a dissolvable fining material component. In this way, the fining agent(s) may selectively target the gas bubbles drawn under the skimmer within the undercurrent of the molten glass for removal. The method may be employed to fine molten gas produced in a submerged combustion melter. A fining vessel for fining molten glass is also disclosed.

26 Claims, 6 Drawing Sheets

(56) References Cited

U.S. PATENT DOCUMENTS

| | | | | |
|---|---|---|---|---|
| 4,919,700 A * | 4/1990 | Pecoraro | ................... | C03B 5/20 65/134.2 |
| 5,006,144 A * | 4/1991 | Knavish | ................. | C03C 1/004 65/134.3 |
| 5,116,399 A * | 5/1992 | Lauwers | ................. | C03B 5/202 65/135.1 |
| 5,139,558 A * | 8/1992 | Lauwers | ................. | C03B 5/202 65/134.4 |
| 8,707,739 B2 * | 4/2014 | Huber | ................... | C03B 5/2356 65/346 |
| 8,973,405 B2 * | 3/2015 | Charbonneau | ........ | C03B 5/2356 65/134.5 |
| 9,096,452 B2 * | 8/2015 | Charbonneau | .......... | C03B 5/235 |
| 9,145,319 B2 | 9/2015 | Mobley et al. | | |
| 9,227,865 B2 * | 1/2016 | Shock | ....................... | C03B 5/20 |
| 9,533,905 B2 * | 1/2017 | Charbonneau | .......... | C03B 5/173 |
| 9,643,869 B2 * | 5/2017 | Shock | ................... | C03B 5/2356 |
| RE46,462 E | 7/2017 | Huber et al. | | |
| 9,856,958 B2 | 1/2018 | Basin et al. | | |
| 10,125,042 B2 * | 11/2018 | McCann | ................... | C03B 5/24 |
| 10,233,105 B2 * | 3/2019 | Faulkinbury | ............. | C03B 5/04 |
| 10,322,960 B2 * | 6/2019 | Martin | ................... | C03C 11/007 |
| 10,670,261 B2 * | 6/2020 | Baker | ................... | C03B 5/2356 |
| 2002/0092325 A1 * | 7/2002 | Muschik | ................. | C03B 5/225 65/134.3 |
| 2002/0166343 A1 * | 11/2002 | LeBlanc | ................. | C03B 5/235 65/134.4 |
| 2006/0105899 A1 * | 5/2006 | Jacques | ..................... | C03B 5/20 501/56 |
| 2006/0242996 A1 * | 11/2006 | DeAngelis | ............ | C03B 5/1677 65/134.1 |
| 2009/0176639 A1 * | 7/2009 | Jacques | ................... | C03B 5/173 501/17 |
| 2010/0313604 A1 * | 12/2010 | Watson | ................... | F23L 7/007 65/136.3 |
| 2011/0088432 A1 * | 4/2011 | Purnode | .................... | C03B 5/04 65/181 |
| 2012/0125050 A1 * | 5/2012 | Murakami | ............ | C03B 17/064 65/90 |
| 2013/0072371 A1 * | 3/2013 | Jansen | .................... | C03B 5/225 65/347 |
| 2014/0090419 A1 * | 4/2014 | Charbonneau | .......... | C03B 5/225 65/27 |
| 2014/0090421 A1 * | 4/2014 | Shock | ................... | C03B 5/2356 65/134.4 |
| 2014/0090423 A1 * | 4/2014 | Charbonneau | .......... | C03B 5/173 65/134.5 |
| 2014/0090424 A1 * | 4/2014 | Charbonneau | ........ | F23C 99/003 65/134.9 |
| 2014/0144183 A1 * | 5/2014 | Demirbas | ............... | C04B 35/64 65/134.4 |
| 2014/0144185 A1 * | 5/2014 | Shock | ..................... | C03B 5/225 65/134.9 |
| 2014/0356608 A1 | 12/2014 | Lentes et al. | | |
| 2015/0251941 A1 * | 9/2015 | Clark | ..................... | C03C 3/078 65/134.2 |
| 2017/0073262 A1 | 3/2017 | Charbonneau et al. | | |
| 2017/0113958 A1 | 4/2017 | Charbonneau et al. | | |
| 2017/0158544 A1 | 6/2017 | Shock et al. | | |
| 2019/0284076 A1 * | 9/2019 | Wang | ..................... | C03B 5/207 |
| 2019/0284079 A1 * | 9/2019 | Wang | ..................... | C03B 5/262 |
| 2020/0199003 A1 * | 6/2020 | Anderson | ................. | C03B 5/43 |
| 2021/0094856 A1 * | 4/2021 | Weil | ....................... | C03B 5/2356 |
| 2021/0094858 A1 * | 4/2021 | Wang | ................... | C03B 5/2356 |
| 2021/0094859 A1 * | 4/2021 | Wang | ..................... | C03B 5/225 |
| 2021/0094860 A1 * | 4/2021 | Pinc | .......................... | C03B 5/24 |
| 2021/0094861 A1 * | 4/2021 | Wang | ..................... | C03B 5/225 |
| 2021/0246061 A1 * | 8/2021 | Vempati | ................. | C03C 4/0092 |

OTHER PUBLICATIONS

International Search Report and Written Opinion, Int. Application No. PCT/US2020/053205, Int. Filing Date: Sep. 29, 2020, Applicant: Owens-Brockway Glass Container Inc., dated Dec. 3, 2020.

* cited by examiner

SELECTIVE CHEMICAL FINING OF SMALL BUBBLES IN GLASS

The present disclosure is directed to glass fining and, more specifically, to techniques for targeting and selectively exposing small bubbles, which might otherwise be too small to quickly ascend to the glass surface, to a fining agent.

BACKGROUND

Glass is a rigid amorphous solid that has numerous applications. Soda-lime-silica glass, for example, is used extensively to manufacture flat glass articles including windows, hollow glass articles including containers such as bottles and jars, and also tableware and other specialty articles. Soda-lime-silica glass comprises a disordered and spatially crosslinked ternary oxide network of $SiO_2$—$Na_2O$—$CaO$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass articles more practical and less energy intensive than pure silica glass while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

The manufacture of glass involves melting a vitrifiable feed material (sometimes referred to as a glass batch) in a furnace or melter within a larger volume of molten glass. The vitrifiable feed material may include virgin raw materials, recycled glass (i.e., cullet), glass precursor oxides, etc., in proportions that result in glass having a certain glass composition upon melting and reacting of the feed material. When the vitrifiable feed material is melted into glass, gas bubbles of various sizes are typically produced and become entrained within the glass. The production of gas bubbles is especially pronounced if the vitrifiable feed material is melted in a submerged combustion melter that includes submerged burners positioned to fire their combustion products directly into the glass melt. The quantity of gas bubbles entrained within the glass may need to be reduced to satisfy commercial specifications for "bubble free" glass. The removal of gas bubbles—a process known as "fining"—may be warranted for various reasons including the visual appearance of the glass when cooled and formed into a finished commercial article such as a glass container, flat glass product, or tableware. Glass fining has traditionally been accomplished by heating the glass to achieve a glass viscosity more conducive to bubble ascension and/or by adding a fining agent into the glass.

A fining agent is chemical compound that reacts within the glass at elevated temperatures to release fining gases such as $O_2$, $SO_2$, and/or possibly others into the glass. The fining gases help eradicate smaller gas bubbles that result from melting of the vitrifiable feed material other than those attributed to the fining agent ("native bubbles"). The fining gases, more specifically, form new gas bubbles ("fining bubbles") and/or dissolve into the glass melt. The fining bubbles rapidly ascend to the surface of the glass—where they ultimately exit the glass melt and burst—and during their ascension may sweep up or absorb the smaller native gas bubbles along the way. The fining gases that dissolve into the glass melt may diffuse into the smaller native bubbles to increase the size and the buoyancy rise rate of those bubbles. The fining gases may also change the redox state [$Fe^{2+}/(Fe^{2+}+Fe^{3+})$ in which $Fe^{2+}$ is expressed as FeO and $Fe^{3+}$ is expressed as $Fe_2O_3$] of the glass and cause some of the smaller native bubbles to disappear as the gas(es) in those bubbles dissolves into the glass melt. Any one or a combination of these mechanisms may be attributed to the fining agent.

A fining agent has traditionally been added to the vitrifiable feed material or metered separately into the glass. Whether the fining agent is included in the vitrifiable feed material or added separately, the resultant fining gases interact indiscriminately with gas bubbles of all sizes within the glass. Such broad exposure of the fining gases to all gas bubbles is somewhat inefficient since the larger native bubbles will quickly ascend through the glass and burst on their own regardless of whether a fining agent is added to the glass. Additionally, if the fining agent is introduced separately from the vitrifiable feed material, mechanical stirring may be used to uniformly mix the fining agent throughout the glass. But stirring the glass breaks larger native bubbles into smaller gas bubbles and counteracts the fining process by drawing bubbles (both large and small) back down into the glass away from the surface of the glass. As such, to clear the glass of bubbles, the amount of the fining agent added to the glass is usually based on the total amount of native gas bubbles that may be contained in the glass even though the smaller native bubbles dictate how much time is required to fine the glass since those bubbles ascend through the glass at the slowest pace or do not ascend at all.

The current practices of unselectively introducing a fining agent into the glass requires the consumption of an excess amount of the fining agent. This can increase the cost of materials as well as the operating costs associated with the fining process. Moreover, the fining process is not as optimized as it could be due to the oversupply of the fining agent and the corresponding fining activity that must be supported, which results in additional fining time beyond what is theoretically required to remove only the smaller native bubbles. The present disclosure addresses these shortcomings of current fining procedures by selectively exposing the smaller native bubbles in the glass to one or more fining agents. The targeted exposure of smaller native bubbles to the fining agent(s) may reduce the need to add excessive amounts of the fining agent to the glass, thus saving material and energy costs, and may also speed the overall fining process since the fining gases introduced into the glass can be minimized while still targeting and removing the smaller native bubbles. The fining agent(s) do not necessarily have to be exposed to the larger native bubbles since doing so is unlikely to have a noticeable impact on the amount of time it takes to fine the glass.

SUMMARY OF THE DISCLOSURE

The present disclosure is directed to an apparatus and method for fining glass. The apparatus is a fining vessel that receives an input molten glass. The input molten glass has a first density and a first concentration of entrained gas bubbles. The fining vessel may be a stand-alone tank that receives the input molten glass from a separate melter, such as a submerged combustion melter, or it may be part of a larger Siemens-style furnace that receives the input molten glass from an upstream melting chamber. The input molten glass is combined with and subsumed by a molten glass bath contained within a fining chamber defined by a housing of the fining vessel. The molten glass bath flows through the fining chamber along a flow direction from an inlet to an outlet of the fining vessel. Output molten glass is discharged from the fining vessel after flowing through the fining chamber. The output molten glass has a second density that is greater than the first density and a second concentration of entrained gas bubbles that is less than the first concentration of entrained gas bubbles. To facilitate fining of the glass, a skimmer is partially submerged in the molten glass bath. The skimmer defines a submerged passageway together with corresponding portions of the housing of the fining vessel. An undercurrent of the molten glass bath flows through the submerged passageway and is exposed to one or more fining agents beneath the skimmer to better target smaller gas bubbles for removal.

The present disclosure embodies a number of aspects that can be implemented separately from or in combination with each other. According to one embodiment of the present disclosure, a method of fining glass includes several steps. One step of the method involves supplying input molten glass into a fining chamber of a fining vessel. The input molten glass combines with a molten glass bath contained within the fining chamber and introduces entrained gas bubbles into the molten glass bath. The input molten glass has a density and a concentration of gas bubbles. Another step of the method involves flowing the molten glass bath through the fining chamber in a flow direction. The molten glass bath has an undercurrent that flows beneath a skimmer, which is partially submerged in the molten glass bath, and through a submerged passageway defined in part by the skimmer. Still another step of the method involves introducing one or more fining agents into the undercurrent of the molten glass bath directly beneath the skimmer from a dissolvable fining material component.

According to another aspect of the present disclosure, a method of producing and fining glass includes several steps. One step of the method involves discharging combustion products from one or more submerged burners directly into a glass melt contained within an interior reaction chamber of a submerged combustion melter. The combustion products discharged from the one or more submerged burners agitate the glass melt. Another step of the method involves discharging foamy molten glass obtained from the glass melt out of the submerged combustion melter. Still another step of the method involves supplying the foamy molten glass into a fining chamber of a fining vessel as input molten glass. The input molten glass combines with a molten glass bath contained within the fining chamber and introduces entrained gas bubbles into the molten glass bath. The input molten glass has a density and comprises up to 60 vol % bubbles. Yet another step of the method involves flowing the molten glass bath through the fining chamber in a flow direction. The molten glass bath has an undercurrent that flows beneath a skimmer, which is partially submerged in the molten glass bath, and through a submerged passageway defined in part by the skimmer. Another step of the method involves introducing one or more fining agents into the undercurrent of the molten glass bath directly beneath the skimmer from a dissolvable fining material component. And another step of the method involves discharging output molten glass from the fining vessel. The output molten glass has a density that is greater than the density of the input molten glass and further comprises less than 1 vol % bubbles.

According to yet another aspect of the present disclosure, a fining vessel for fining glass includes a housing that defines a fining chamber. The housing has a roof, a floor, and an upstanding wall that connects the roof and the floor, and further defines an inlet to the fining chamber and an outlet from the fining chamber. The fining vessel also includes a skimmer that extends downwards from the roof of the housing towards the floor of the housing and further extends across the fining chamber between opposed lateral sidewalls of the upstanding wall. The skimmer has a distal free end that together with corresponding portions of the floor and the upstanding wall defines a submerged passageway. Additionally, a dissolvable fining material component is disposed directly beneath the skimmer. The dissolvable fining material component comprises a mixture of a glass compatible base material and one or more fining agents.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
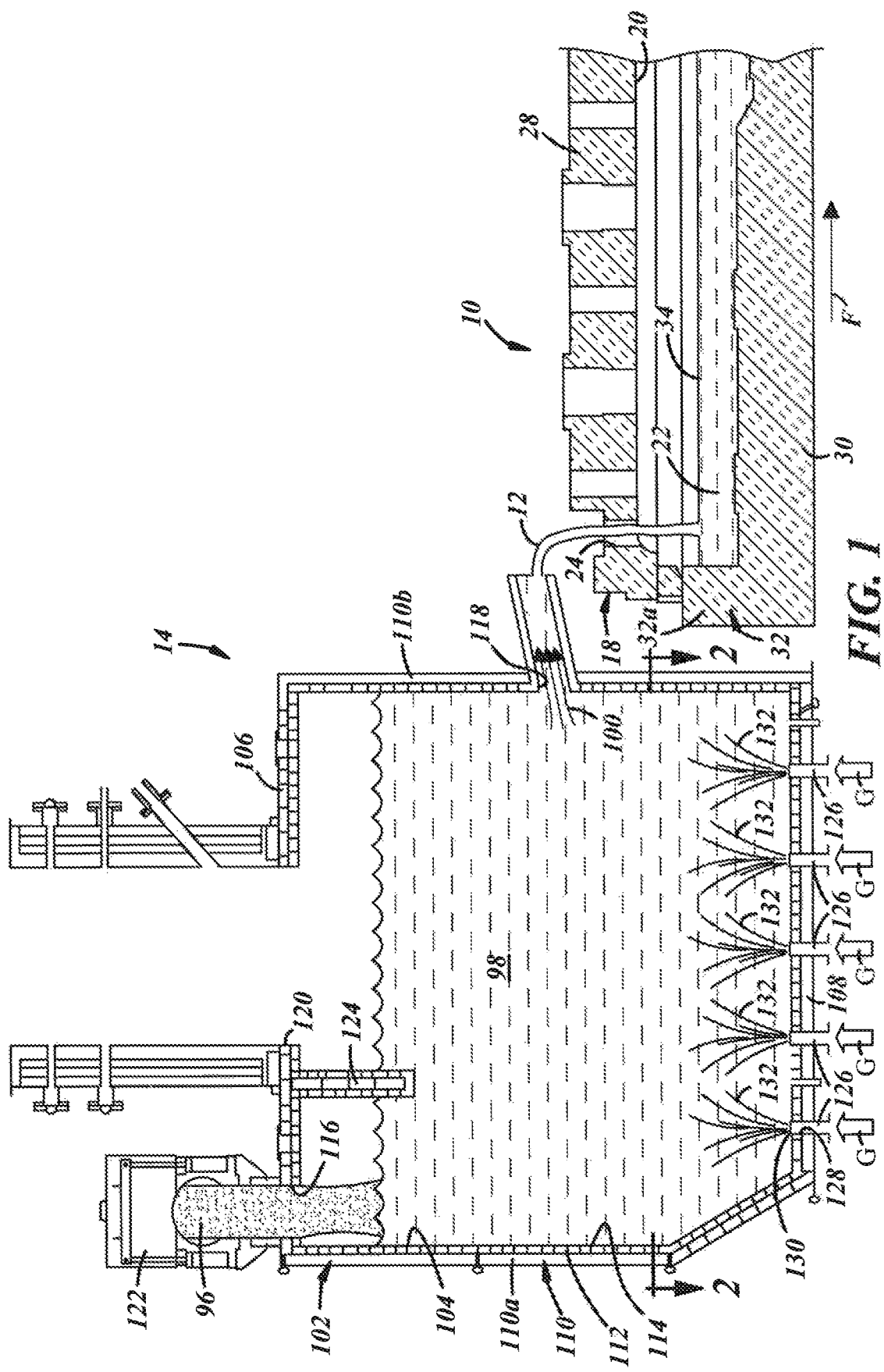
FIG. 1 is an elevated cross-sectional representation of a submerged combustion melter and a fining vessel that receives molten glass produced by the submerged combustion melter according to one embodiment of the present disclosure.
Figure 2:
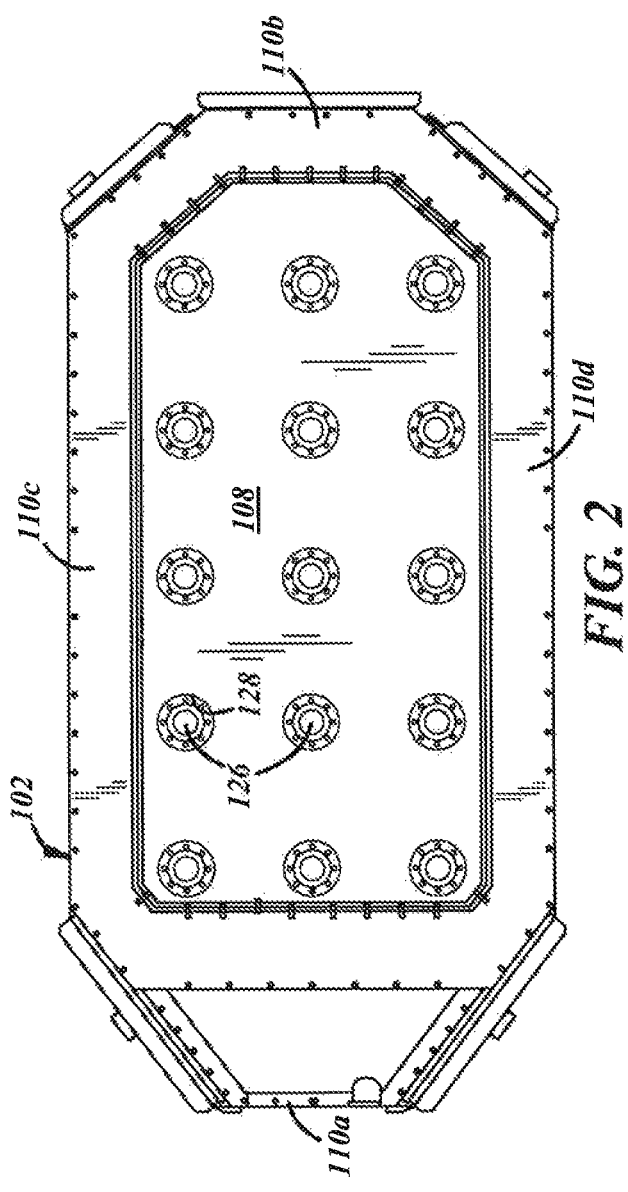
FIG. 2 is a cross-sectional plan view of the floor of the submerged combustion melter illustrated in FIG. 1 and taken along section line 2-2.

The disclosed apparatus and fining method are preferably used to fine molten glass produced by melting a vitrifiable feed material via submerged combustion melting. As will be described in further detail below, submerged combustion melting involves injecting a combustible gas mixture that comprises fuel and an oxidant directly into a glass melt contained in a submerged combustion melter though submerged burners. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the glass melt. While submerged combustion technology can melt and integrate a vitrifiable feed material into the glass melt relatively quickly, thus resulting in relatively low glass residence times, the glass melt tends to be foamy and have a relatively low density despite being chemically homogenized when discharged from the melter. Fining foamy molten glass discharged from the glass melt in accordance with the present disclosure can render the fining process more efficient. Of course, molten glass produced in other types of melting apparatuses, including a melting chamber of a conventional Siemens-style furnace, may also be fined in the same way.

Referring now to FIGS. 1-5, a glass fining vessel 10 is depicted according to one embodiment of the present disclosure. The glass fining vessel 10 receives an input molten glass 12 that originates from within a submerged combustion melter 14 and discharges output molten glass 16 for additional processing into a finished article. The glass fining vessel 10 has a housing 18 that defines a fining chamber 20 in which a molten glass bath 22 is contained. The housing 18 further defines an inlet 24 through which the input molten glass 12 is received and an outlet 26 through which the output molten glass 16 is discharged. The input molten glass 12 combines with and is subsumed by the molten glass bath 22, and the output molten glass 16 is drawn from the molten glass bath 22 at a location downstream from the inlet 24. As such, the molten glass bath 22 flows through the fining chamber 20 in a flow direction F from the inlet 24 to the outlet 26 of the glass fining vessel 10 while being fined along the way as described in more detail below.

The housing 18 of the glass fining vessel 10 includes a roof 28, a floor 30, and an upstanding wall 32 that connects the roof 28 and the floor 30. The upstanding wall 32 typically includes an inlet or front end wall 32a, an outlet or back end wall 32b, and two opposed lateral sidewalls 32c, 32d that join the inlet end and outlet end walls 32a, 32b. The housing 18 of the fining vessel 10 is constructed from a one or more refractory materials. Refractory materials are a class of inorganic, non-metallic materials that can withstand high-temperatures while remaining generally resistant to thermal stress and corrosion. In one particular embodiment, the floor 30 and the glass-contacting portions of the upstanding wall 32 may be formed from fused cast AZS (alumina-zirconia-silicate), bond AZS, castable AZS, high alumina, alumina-chrome, or alumina-silica type refractories. Insulating bricks and ceramic fire boards may be disposed behind these portions of the housing 18. As for the roof 28 and the superstructure (i.e., the non-glass contacting portion of the upstanding wall 32), those portions of the housing 18 may be formed from an alumina-silica refractory such as mullite.

The inlet 24 to the fining vessel 10 may be defined in the roof 28 of the housing 18 proximate the inlet end wall 32a, as shown, although it may also be defined in the inlet end wall 32a either above or below a surface 34 of the molten glass bath 22 or in one or both of the lateral sidewalls 32c, 32d either above or below the surface 34 of the molten glass bath 22. The inlet 24 provides an entrance to the fining chamber 20 for the introduction of the input molten glass 12 at a feed rate RF. The inlet 24 may be fluidly coupled to the submerged combustion melter 14 or an intermediate holding tank (not shown) located between the submerged combustion melter 14 and the fining vessel 10 by a contained conduit or, in another implementation, such as the one illustrated here, the inlet 24 may be positioned in flow communication with the input molten glass 12 so that the input molten glass 12 can be poured into the fining chamber 20 while being exposed to the ambient environment. An example of an intermediate holding tank that may be fluidly positioned between the submerged combustion melter 14 and the fining vessel 10 is the stilling vessel that is disclosed in U.S. Pub. No. 2021/0094857 (U.S. application. Ser. No. 16/590,068), which is assigned to the assignee of the present invention and is incorporated herein by reference in its entirety.

The outlet 26 of the fining vessel 10 may be defined in the outlet end wall 32b either adjacent to the floor 30 (as shown) or above the floor 30 yet beneath the surface 34 of the molten glass bath 22. The outlet 26 may also be defined in the floor 30 or in one or both of the lateral sidewalls 32c, 32d beneath the surface 34 of the molten glass bath 22 and proximate the outlet end wall 32b. The outlet 26 provides an exit from the fining chamber 20 for the discharge of the output molten glass 16 at a discharge or pull rate $R_D$. In the context of commercial glass container manufacturing, the outlet 26 of the fining vessel 10 may fluidly communicate with a spout chamber 36 of a spout 38 appended to the outlet end wall 32b. The spout 38 includes a spout bowl 40, which defines the spout chamber 36 along with an orifice plate 42, and further includes at least one reciprocal plunger 44 that reciprocates to control the flow of accumulated output molten glass 46 held within the spout chamber 36 through an aligned orifice 48 in the orifice plate 42 to fashion streams or runners of glass. These streams or runners of glass may be sheared into glass gobs of a predetermined weight that can be individually formed into glass containers upon delivery to a glass container forming machine.

Figure 11:
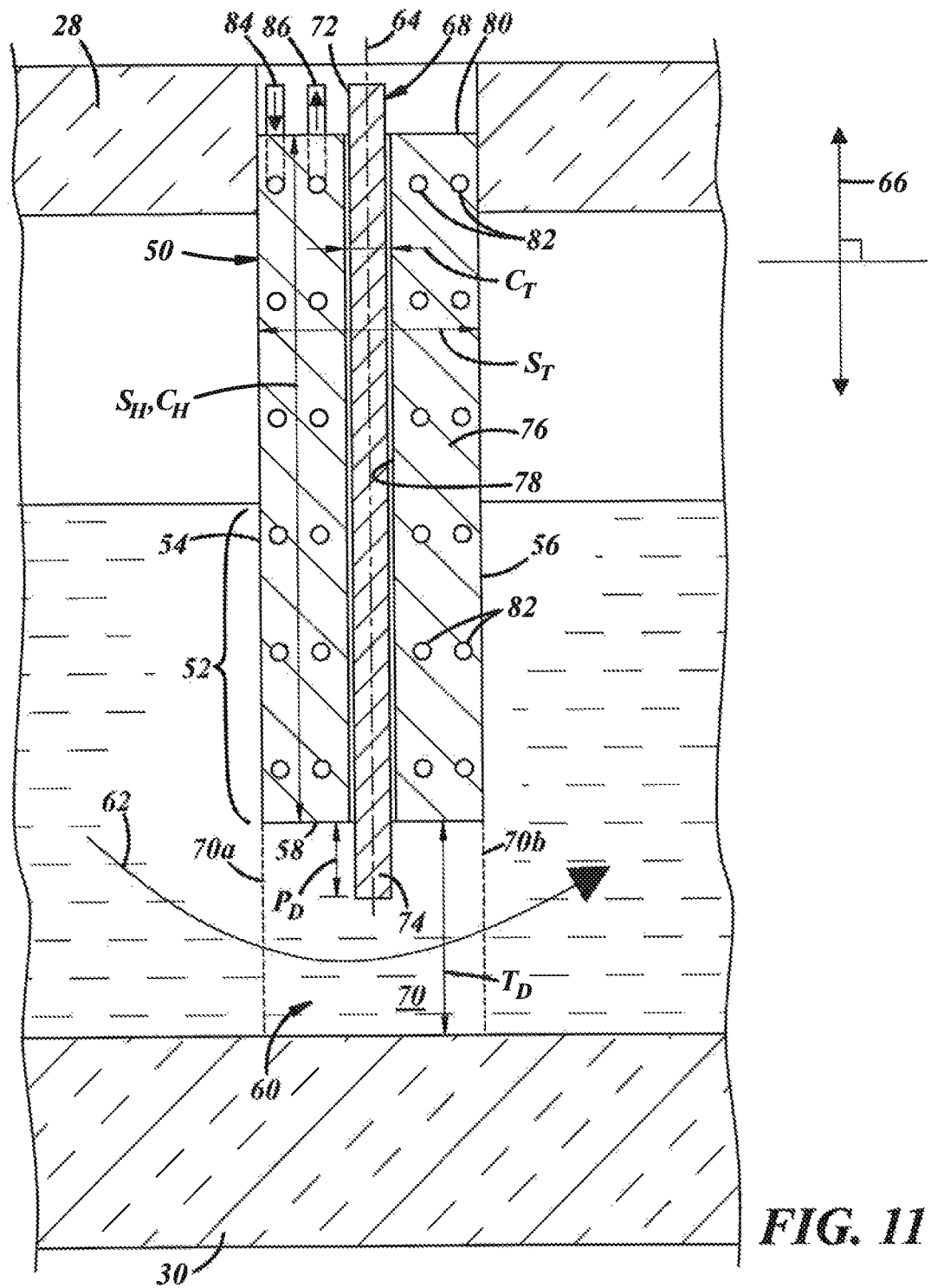
FIG. 11 is a magnified view of the skimmer illustrated in FIG. 3.

The fining vessel 10 includes a skimmer 50 positioned between the inlet 24 and the outlet 26. As shown best in FIGS. 5 and 11, the skimmer 50 extends downwardly from the roof 28 of the housing 18 and is partially submerged in the molten glass bath 22. At least a submerged portion 52 of the skimmer 50 extends across the fining chamber 20 between the lateral sidewalls 32c, 32d of the housing 18 and has an upstream face 54, an opposite downstream face 56, and a distal free end 58 connecting the upstream and downstream faces 54, 56. The distal free end 58 of the skimmer 50 defines a submerged passageway 60 along with corresponding portions of the floor 30 and the sidewalls 32c, 32d. The establishment of the submerged passageway 60 causes an undercurrent 62 of the molten glass bath 22 to flow beneath the skimmer 50 and through the submerged passageway 60 as the glass bath 22 as a whole flows along the flow direction F towards the outlet 26 of the fining vessel 10. The skimmer 50 has a centerplane 64 that is parallel to a vertical reference plane 66 (FIG. 11), which is perpendicular to the horizontal or gravity level, or angled at no more than 5° from the vertical reference plane 66 in either direction.

At least one fining agent is introduced into the molten glass bath 22 directly beneath the skimmer 50 in direct exposure to the undercurrent 62 of the molten glass bath 22 from a dissolvable fining material component 68 that includes one or more fining agents. The term "directly beneath the skimmer" as used herein refers to a zone 70 (FIG. 11) of the fining chamber 20 defined by sectioning the skimmer 50 where its thickness $S_T$ as measured between the upstream face 54 and the downstream face 56 is greatest, and then extending first and second planes 70a, 70b from the upstream and downstream faces 54, 56 of the skimmer 50 where sectioned, respectively, parallel with the centerplane 64 of the skimmer 50 such that the planes 70a, 70b intersect the floor 30 and the upstanding wall 32 of the housing 18. The volume between the skimmer 50, the floor 30, the sidewalls 32c, 32d, and the extended planes 70a, 70b is the zone 70 that is considered to be directly beneath the skimmer 50. By introducing at least one fining agent into this zone 70, smaller gas bubbles can more easily be targeted for removal.

The dissolvable fining material component 68 comprises a mixture of a glass compatible base material and one or more fining agents. The mixture may be physically compacted or bound together by a binder. The glass compatible base material is any material that contributes only compounds into the glass that are already part of the glass chemical composition. For instance, if the molten glass bath 22 is composed of soda-lime-silica glass, the glass compatible base material is formulated to introduce one or more of $SiO_2$, $Na_2O$, or CaO, and/or any other component of soda-lime-silica glass, into the molten glass bath 22. To that end, the glass compatible base material may be soda-lime-silica glass, the vitrifiable feed material that is being melted in the upstream submerged combustion melter 14, pulverized soda-lime-silica cullet, a precursor oxide of soda-lime-silica glass such as $SiO_2$—$Na_2O$, $Na_2O$—CaO, or sodium silicate, or combinations thereof. The one or more fining agents may be any compound or a combination of compounds that release fining gases into the molten glass bath 22. In particular, the fining agent(s) may include a sulfate such as sodium sulfate (salt cake), which decomposes to release $O_2$ and $SO_2$ as the fining gases. Other fining agents that may be employed include $Cr_2O_3$, $WO_3$, reactive carbon, aluminum, a carbonate, silicon carbide (SiC), or an oxidized metal powder.

The dissolvable fining material component 68 may be disposed directly beneath the skimmer 50 in several different ways. In one implementation, as shown best in FIG. 11, the dissolvable fining material component 68 is a solid plate 72 supported within the skimmer 50. The solid plate 72 has an exposed portion 74 that protrudes a distance $P_D$ beyond the distal free end 58 of the skimmer 50 that is less than a distance $T_D$ between the free end 58 of the skimmer 50 and the floor 30 of the housing 18. In this construction, the skimmer 50 has a main body 76 that defines an internal cavity 78. The internal cavity 78 has a width $C_W$ (FIG. 4) that extends along a width $S_W$ of the skimmer 50—the skimmer width $S_W$ being the size dimension of the skimmer 50 in a direction extending between the lateral sidewalls 32c, 32d—and a thickness $C_T$ (FIG. 11) that extends along the thickness $S_T$ of the skimmer 50. The width and thickness $C_W$, $C_T$ of the internal cavity 78 are both less than the width and thickness $S_W$, $S_T$ of the skimmer 50. The internal cavity 78 also has a height $C_H$ (FIG. 11) that extends along a height $S_H$ of the skimmer 50—the skimmer height $S_H$ being the size dimension of the skimmer 50 in a direction extending between the roof 28 and the floor 30—while traversing the skimmer 50 such that the cavity 78 is open at the distal free end 58 and an opposed upper end 80 of the skimmer 50. The opposed upper end 80 of the skimmer 50 is preferably held outside of the fining chamber 20 by the housing 18 of the fining vessel 10.

The solid plate 72 may be inserted into the internal cavity 78 through the opposed upper end 80 of the skimmer 50 and, additionally, is moveable relative to the main body 76 along the height $S_H$ of the skimmer 50. The moveable nature of the solid plate 72 permits the solid plate 72 to be slid downwardly through the skimmer 50 and past the distal free end 58 of the skimmer 50 towards the floor 30 of the housing 18. The solid plate 72 may be slid at a constant velocity or intermittently as needed. In that regard, as the exposed portion 74 of the solid plate 72 disintegrates over time due to constant exposure to the undercurrent 62 of the molten glass bath 22 passing through the submerged passageway 60, the solid plate 72 may be advanced to maintain the exposed portion 74 at the desired distance $P_D$ beyond the distal free end 58 of the skimmer 50.

To help ensure that the portion of the solid plate 72 within the main body 76 is preserved, the main body 76 may be constructed from a refractory material, such as the refractories disclosed above for the glass-contacting portions of the upstanding wall 32, and is preferably liquid cooled. The main body 76 may be liquid cooled by a distribution of cooling tubes 82 encased within the main body 76 that fluidly communicate with an inlet cooling tube 84 and an outlet cooling tube 86. A cooling fluid such as water may be circulated into the inlet cooling tube 84, through the distribution of cooling tubes 82, and out of the outlet cooling tube 86 to maintain the main body 76, especially the part within the submerged portion 52 of the skimmer 50, at a temperature below the temperature of the molten glass bath 22. In many instances, a temperature differential between a temperature of the cooling fluid entering the main body 76 of the skimmer 50 at the inlet cooling tube 84 and a temperature of the cooling fluid exiting the main body 76 of the skimmer 50 at the outlet cooling tube is maintained at less than 20° C., or more narrowly between 5° C. and 15° C. This condition creates a thin layer of high viscosity glass melt immediately adjacent to the submerged portion 52 of the skimmer 50, which, in turn, protects the skimmer 50 against thermal and corrosive damage and extends the operational lifetime of the skimmer 50.

The skimmer 50 may separate gas bubbles 88 introduced into the molten glass bath 22 by the input molten glass 12 according to the size of the gas bubbles 88. As discussed above, the input molten glass 12 contains bubbles of various sizes as a result of melting the vitrifiable feed material in the submerged combustion melter 14. The input molten glass 12 has a first density and first concentration of entrained gas bubbles. Here, as a result of submerged combustion melting, the input molten glass 12 typically has a density between 0.75 gm/cm$^3$ and 1.5 gm/cm$^3$, or more narrowly between 0.99 gm/cm$^3$ and 1.3 gm/cm$^3$, and a concentration of entrained gas bubbles ranging from 30 vol % to 60 vol % for soda-lime-silica glass. The gas bubbles carried within the input molten glass 12 and added to the molten glass bath 22 have a diameter that typically ranges from 0.10 mm to 0.9 mm and, more narrowly, from 0.25 mm to 0.8 mm. Compared to gas bubbles having a diameter of greater than 0.7 mm, gas bubbles having a diameter of 0.7 mm or less are more likely to remain suspended in the deeper regions of the molten glass bath 22 as the molten glass bath 22 flows along the flow direction F. The density and bubble concentration values stated above may be different. For example, if the input molten glass 12 is obtained from a Siemens-style melting furnace, the density and bubble concentration values would likely be greater than, and less than, the above-stated ranges, respectively, for soda-lime-silica glass.

The skimmer 50 can be sized and positioned to achieve the desired separation of the gas bubbles 88. Each of the following three design characteristics of the skimmer 50 effects the size of the bubbles that pass beneath the skimmer 50 and through the submerged passageway 60: (1) a distance $S_D$ between the centerplane 64 of the skimmer 50 at the axial free end 58 and the inlet end wall 32a along the flow direction F; (2) the distance $T_D$ between the free end 58 of the skimmer 50 and the floor 30 of the housing 18; and (3) the discharge rate $R_D$ of the output molten glass 16 through the outlet 26 of the fining vessel 10. By increasing the distance $S_D$ between the skimmer 50 and the inlet end wall 32a (characteristic 1 above), the bubbles 88 have more time to ascend to the surface 34 of the molten glass batch 22 and burst before reaching the upstream face 54 of the skimmer 50. Likewise, decreasing the distance $S_D$ between the skimmer 50 and the inlet end wall 32a provides the bubbles 88 with less time to ascend to the surface 34 of the molten glass bath 22 and burst. Accordingly, the size of the gas bubbles 88 that are drawn under the skimmer 50 within the undercurrent 62 tends to decrease as the distance $S_D$ between the skimmer 50 and the inlet end wall 32a increases.

Additionally, the size of the gas bubbles 88 that are drawn under the skimmer 50 within the undercurrent 62 tends to decrease as the distance $T_D$ between the free end 58 of the skimmer 50 and the floor 30 of the housing 18 (characteristic 2 above) decreases, and vice versa. Indeed, as the distance $T_D$ between the free end 58 of the skimmer 50 and the floor 30 decreases, the skimmer 50 is submerged deeper into the molten glass bath 22 and the size of the gas bubbles 88 that are drawn under the skimmer 50 within the undercurrent 62 also decreases. Conversely, as the distance $T_D$ between the free end 58 of the skimmer 50 and the floor 30 increases, the skimmer 50 is submerged shallower into the molten glass bath 22, and the size of the gas bubbles 88 being drawn under the skimmer 50 within the undercurrent 62 increases since molten glass closer to the surface 34 of the molten glass bath 22 can now flow beneath the skimmer 50. Lastly, a higher discharge rate $R_D$ of the output molten glass 16 (characteristic 3 above) reduces the residence time of the molten glass bath 22 and tends to increase the size of the gas bubbles 88 that are drawn under the skimmer 50 within the undercurrent 62, while a lower discharge rate $R_D$ of the output molten glass 16 has the opposite effect.

By balancing the three design characteristics set forth above, the skimmer 50 may be sized and positioned so that the gas bubbles 88 that pass beneath the skimmer 50 within the undercurrent contain at least 95% of smaller gas bubbles that have diameters of less than 0.7 mm or, more preferably, less than 0.5 mm. The larger gas bubbles having diameters of 0.7 mm or greater ascend too quickly and eventually rise to the surface 34 of the molten glass bath 22 upstream of the skimmer 50 and burst. In one implementation of the skimmer 50, in which the glass discharge rate (characteristic 3) is 100 tons per day, the first and second design characteristics set forth above may lie within the ranges detailed below in Table 1 to achieve at least 95% of smaller gas bubbles within the undercurrent 62, although other combinations of characteristics 1-3 are certainly possible.

TABLE 1

| Skimmer Parameters (100 tpd glass discharge rate) | |
| --- | --- |
| Parameter | Range |
| $S_D$ | 180 Feet to 250 Feet |
| $T_D$ | 3 Inches to 10 Inches |

Using the skimmer 50 to separate the gas bubbles 88 so that a contingent of smaller gas bubbles primarily passes beneath the skimmer 50 is advantageous in one respect; that is, the separation ensures that the smaller gas bubbles carried by the undercurrent 62 through the submerged passageway 60 are selectively exposed to the dissolvable fining material component 68 and the fining gases produced from the fining agent(s) released from the component 68 into the molten glass bath 22.

Figure 5:
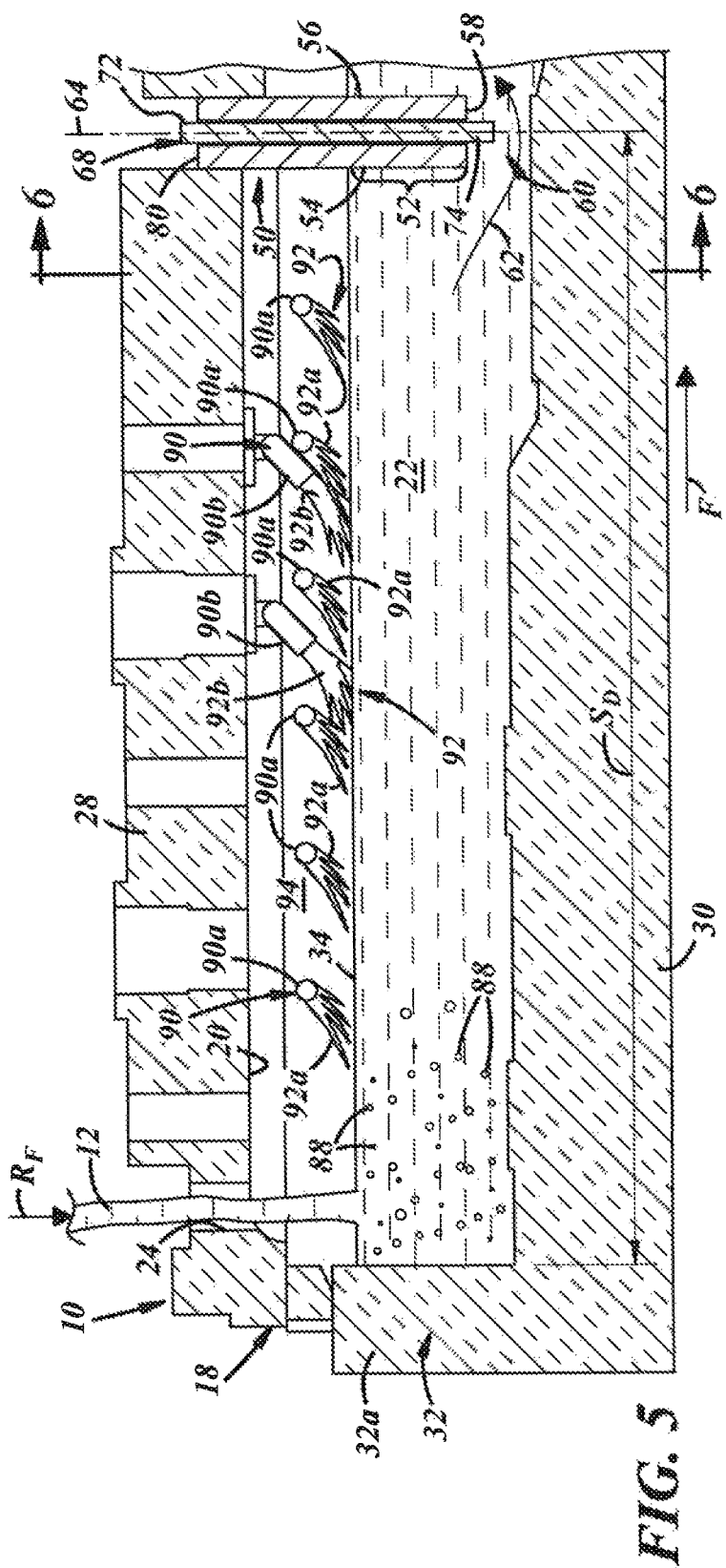
FIG. 5 is a magnified elevated cross-sectional view of a portion of the fining vessel illustrated in FIG. 3 including a skimmer positioned within the fining vessel according to one embodiment of the present disclosure.
Figure 6:
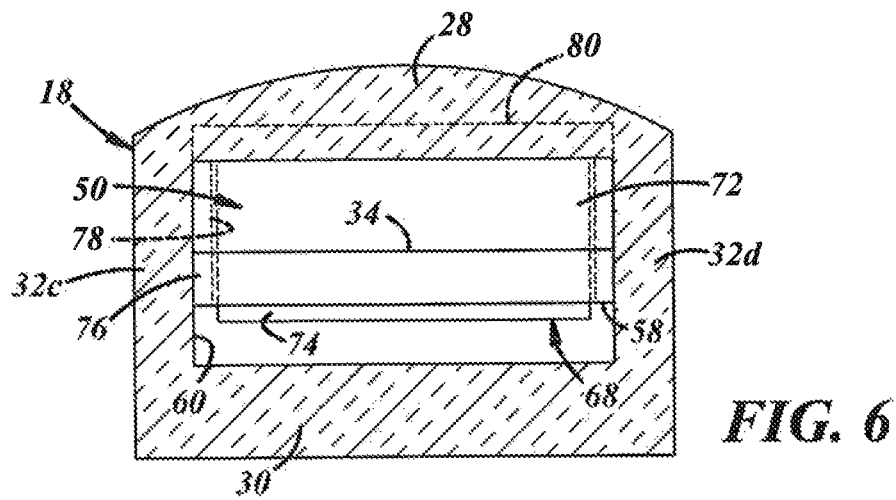
FIG. 6 is cross-sectional view of the fining vessel taken along section lines 6-6 in FIG. 5.

The housing 18 of the fining vessel 10 may also support one or more non-submerged burners 90 to heat the molten glass bath 22 and curtail an undesired increase in viscosity. Each of the non-submerged burners 90 combusts a mixture of a fuel and an oxidant. The non-submerged burners 90 may include one or more sidewall burners 90a mounted in one or both of the lateral sidewalls 32c, 32d of the housing 18, one or more roof burners 90b mounted in the roof 28 of the housing 18, or both types of burners 90a, 90b. For example, as shown in FIG. 5, a plurality of sidewall burners 90a may be mounted in one or both of the sidewalls 32c, 32d in spaced relation along the flow direction F between the inlet 24 and the outlet 26 of the fining vessel 10. Each of the plurality of sidewall burners 90a may be fixedly or pivotably mounted within a burner block. The combustion products 92a emitted from the burners 90a may be aimed into an open atmosphere 94 above the surface 34 of the molten glass bath 22 or, alternatively, may be aimed toward the molten glass bath 22 so that the combustion products 92a directly impinge the surface 34 of the molten glass bath 22. The sidewall burners 90a may be pencil burners or some other suitable burner construction.

In addition to or in lieu of the sidewall burner(s) 90a, a plurality of roof burners 90b may be mounted in the roof 28 in spaced relation along the flow direction between the inlet 24 and the outlet 26 of the housing 18. In some instances, and depending on the burner design, multiple rows of roof burners 90b may be spaced along the flow direction F of the molten glass bath 22, with each row of burners 90b including two or more burners 90b aligned perpendicular to the flow direction F. Each of the roof burners 90b may be a flat flame burner that supplies low-profile combustion products 92b and heat into the open atmosphere 94 above the surface 34 of the molten glass, or, in an alternate implementation, and as shown here, each burner 90b may be a burner that is fixedly or pivotably mounted within a burner block and aimed to direct its combustion products 92b into direct impingement with the top surface 34 of the molten glass bath 22. If a roof burner 90b of the latter impingement variety is employed, the burner is preferably mounted in the roof 28 of the housing 18 upstream of the skimmer 50 to suppress foam build-up.

The non-submerged burner(s) 90 may be configured so that their combustion products 92 impact the surface 34 of the molten glass bath 22 to aid in the fining of particularly foamy molten glass such as, for example, the glass produced in a submerged combustion melter. Foamy glass with a relatively high amount of bubbles can develop a layer of foam that accumulates on top of the molten glass bath 22. A layer of foam of this nature can block radiant heat flow and, as a result, insulate the underlying glass from any heat added to the open atmosphere 94 by non-submerged burners 90 that emit non-impinging combustion products. One way to overcome the challenges posed by foam is to break up or destroy the foam. Direct impingement between the combustion products 92 and the top surface 34 of the molten glass bath 22 can destroy and reduce the volume of any foam layer that may develop on top of the molten glass bath 22, which, in turn, can help improve heat transfer efficiency into the molten glass bath 22.

The operation of the fining vessel 10 will now be described in the context of fining glass produced in the upstream submerged combustion melter 14. In general, and referring now to FIG. 1, the submerged combustion melter (SC melter) 14 is fed with a vitrifiable feed material 96 that exhibits a glass-forming formulation. The vitrifiable feed material 96 is melt-reacted inside the SC melter 14 within an agitated glass melt 98 to produce molten glass. Foamy molten glass 100 is discharged from the SC melter 14 out of the glass melt 98. The foamy molten glass 100 is supplied to the fining vessel 10 as the input molten glass 12. The input molten glass 12 combines with and is subsumed by the molten glass bath 22 contained in the fining chamber 20 of the fining vessel 10. The molten glass bath 22 flows along the flow direction F from the inlet 24 of the fining vessel 10 to the outlet 26. As a result of this flow, the undercurrent 62 of the molten glass bath 22 that flows beneath the skimmer 50 is directly exposed to the dissolvable fining material component 68 and the fining agent(s) released from the component 68. The introduction of fining agents into the molten glass bath 22 directly beneath the skimmer 50 can selectively target smaller, more-difficult-to-remove gas bubbles, especially if the skimmer 50 is used to separate the gas bubbles 88 introduced into the molten glass bath 22 from the input molten glass 12 based on bubble size.

The SC melter 14 includes a housing 102 that defines an interior reaction chamber 104. The housing has a roof 106, a floor 108, and a surrounding upstanding wall 110 that connects the roof 106 and the floor 108. The surrounding upstanding wall 110 further includes a front end wall 110a, a back end wall 110b that opposes and is spaced apart from the front end wall 110a, and two opposed lateral sidewalls 110c, 110d that connect the front end wall 110a and the back end wall 110b. The interior reaction chamber 104 of the SC melter 14 holds the glass melt 98 when the melter 14 is operational. At least the floor 108 and the surrounding upstanding wall 110 of the housing 102, as well as the roof 106 if desired, may be constructed from one or more fluid-cooled panels through which a coolant, such as water, may be circulated. The fluid-cooled panels include a glass-side refractory material layer 112 that may be covered by a layer of frozen glass 114 that forms in-situ between an outer skin of the glass melt 98 and the refractory material layer 112. The glass-side refractory material layer 112 may be constructed from any of the refractories disclosed above for the glass-contacting portions of the upstanding wall 32 of the housing 18 of the fining vessel 10.

The housing 102 of the SC melter 14 defines a feed material inlet 116, a molten glass outlet 118, and an exhaust vent 120. As shown in FIG. 1, the feed material inlet 116 may be defined in the roof 106 of the housing 102 adjacent to or a distance from the front end wall 110a, and the molten glass outlet 118 may be defined in the back end wall 110b of the housing 102 adjacent to or a distance above the floor 108, although other locations for the feed material inlet 116 and the molten glass outlet 118 are certainly possible. The feed material inlet 116 provides an entrance to the interior reaction chamber 104 for the delivery of the vitrifiable feed material 96 by way of a batch feeder 122. The batch feeder 122 is configured to introduce a metered amount of the vitrifiable feed material 96 into the interior reaction chamber 104 and may be coupled to the housing 102. The molten glass outlet 118 outlet provides an exit from the interior reaction chamber 104 for the discharge of the foamy molten glass 100 out of the SC melter 14. The exhaust vent 120 is preferably defined in the roof 106 of the housing 102 between the front end wall 110a and the back end wall 110b and is configured to remove gaseous compounds from the interior reaction chamber 104. And, to help prevent the potential loss of some of the vitrifiable feed material 96 through the exhaust vent 120, a partition wall 124 that depends from the roof 106 of the housing 102 and is partially submerged into the glass melt 98 may be positioned between the feed material inlet 116 and the exhaust vent 120.

The SC melter 14 includes one or more submerged burners 126. Each of the one or more submerged burners 126 is mounted in a port 128 defined in the floor 108 (as shown) and/or the surrounding upstanding wall 110 at a portion of the wall 110 that is immersed by the glass melt 98. Each of the submerged burner(s) 126 forcibly injects a combustible gas mixture G into the glass melt 98 through an output nozzle 130. The combustible gas mixture G comprises fuel and an oxidant. The fuel supplied to the submerged burner(s) 126 is preferably methane or propane, and the oxidant may be pure oxygen or include a high-percentage (>80 vol %) of oxygen, in which case the burner(s) 126 are oxy-fuel burners, or it may be air or any oxygen-enriched gas. Upon being injected into the glass melt 98, the combustible gas mixture G immediately autoignites to produce combustion products 132—namely, $CO_2$, $CO$, $H_2O$, and any uncombusted fuel, oxygen, and/or other gas compounds such as nitrogen—that are discharged into and through the glass melt 98. Anywhere from five to thirty submerged burners 126 are typically installed in the SC melter 14 although more or less burners 126 may be employed depending on the size and melt capacity of the melter 14.

During operation of the SC melter 14, each of the one or more submerged burners 126 individually discharges combustion products 132 directly into and through the glass melt 98. The glass melt 98 is a volume of molten glass that often weighs between 1 US ton (1 US ton=2,000 lbs) and 20 US tons and is generally maintained at a constant volume during steady-state operation of the SC melter 14. As the combustion products 132 are thrust into and through the glass melt 98, which create complex flow patterns and severe turbulence, the glass melt 98 is vigorously agitated and experiences rapid heat transfer and intense shearing forces. The combustion products 132 eventually escape the glass melt 98 and are removed from the interior reaction chamber 104 through the exhaust vent 120 along with any other gaseous compounds that may volatize out of the glass melt 98. Additionally, in some circumstances, one or more non-submerged burners (not shown) may be mounted in the roof 106 and/or the surrounding upstanding wall 110 at a location above the glass melt 98 to provide heat to the glass melt 98, either directly by flame impingement or indirectly through radiant heat transfer, and to also facilitate foam suppression and/or destruction.

While the one or more submerged burners 126 are being fired into the glass melt 98, the vitrifiable feed material 96 is controllably introduced into the interior reaction chamber 104 through the feed material inlet 116. Unlike a conventional glass-melting furnace, the vitrifiable feed material 96 does not form a batch blanket that rests on top of the glass melt 98; rather, the vitrifiable feed material 96 is rapidly disbanded and consumed by the agitated glass melt 98. The dispersed vitrifiable feed material 96 is subjected to intense heat transfer and rapid particle dissolution throughout the glass melt 98 due to the vigorous melt agitation and shearing forces induced by the direct injection of the combustion products 132 from the submerged burner(s) 126. This causes the vitrifiable feed material 96 to quickly mix, react, and become chemically integrated into the glass melt 98. However, the agitation and stirring of the glass melt 98 by the direct discharge of the combustion products 132 also promotes bubble formation within the glass melt 98. Consequently, the glass melt 98 is foamy in nature and includes a homogeneous distribution of entrained gas bubbles. The entrained gas bubbles may account for 30 vol % to 60 vol % of the glass melt 98, which renders the density of the glass melt 98 relatively low, typically ranging from 0.75 gm/cm$^3$ to 1.5 gm/cm$^3$, or more narrowly from 0.99 gm/cm$^3$ to 1.3 gm/cm$^3$, for soda-lime-silica glass. The gas bubbles entrained within the glass melt 98 vary in size and may contain any of several gases including $CO_2$, $H_2O$ (vapor), $N_2$, $SO_2$, $CH_4$, CO, and volatile organic compounds (VOCs).

The vitrifiable feed material 96 introduced into the interior reaction chamber 104 has a composition that is formulated to provide the glass melt 98, particularly at the molten glass outlet 118, with a predetermined glass chemical composition upon melting. For example, the glass chemical composition of the glass melt 98 may be a soda-lime-silica glass chemical composition, in which case the vitrifiable feed material 96 may be a physical mixture of virgin raw materials and optionally cullet (i.e., recycled glass) and/or other glass precursors that provides a source of $SiO_2$, $Na_2O$, and CaO in the correct proportions along with any of the other materials listed below in Table 2 including, most commonly, $Al_2O_3$. The exact materials that constitute the vitrifiable feed material 96 are subject to much variation while still being able to achieve the soda-lime-silica glass chemical composition as is generally well known in the glass manufacturing industry.

TABLE 2

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |

TABLE 2-continued

Glass Chemical Composition of Soda-Lime-Silica Glass

| Component | Weight % | Raw Material Sources |
|---|---|---|
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

For example, to achieve a soda-lime-silica glass chemical composition in the glass melt 98, the vitrifiable feed material 96 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 96 to contribute one or more of $SiO_2$, $Na_2O$, CaO and possibly other oxide and/or non-oxide materials in the glass melt 98 depending on the desired chemistry of the soda-lime-silica glass chemical composition and the color of the glass articles being formed. These other virgin raw materials may include feldspar, dolomite, and calumite slag. The vitrifiable feed material 96 may even include up to 80 wt % cullet depending on a variety of factors. Additionally, the vitrifiable feed material 96 may include secondary or minor virgin raw materials that provide the soda-lime-silica glass chemical composition with colorants, decolorants, and/or redox agents that may be needed, as well as fining agents if such agents are desired to be introduced into the glass melt 98 to complement the fining agents introduced into the molten glass bath 22 by the dissolvable fining material component 68.

Referring now to FIGS. 1, 3, 5, and 11, the foamy molten glass 100 discharged from the SC melter 14 through the molten glass outlet 118 is removed from the glass melt 98 and is chemically homogenized to the desired glass chemical composition, e.g., a soda-lime-silica glass chemical composition, but with the same relatively low density and entrained volume of gas bubbles as the glass melt 98. The foamy molten glass 100 flows into the fining vessel 10 as the input molten glass 12 either directly or through an intermediate stilling or holding tank that may settle and moderate the flow rate of the input molten glass 12. The input molten glass 12 is introduced into the fining chamber 20 through the inlet 24 and combines with and is subsumed by the molten glass bath 22. The blending of the input molten glass 12 with the molten glass bath 22 introduces the gas bubbles 88 into the glass bath 22. These gas bubbles 88 are removed from the molten glass bath 22 as the glass bath 22 flows in the flow direction F from the inlet 24 of the fining vessel 10 to the outlet 26.

As the molten glass bath 22 flows in the flow direction F, the undercurrent 62 of the glass bath 22 flows beneath the skimmer 50 through the submerged passageway 60 to navigate molten glass past the skimmer 50. The undercurrent 62 is selectively and directly exposed to the fining agent(s) that dissolve into the undercurrent 62 from the dissolvable fining material component 68, which, in this particular embodiment, is in the form of a solid plate 72 that is moveable along the height $S_H$ of the skimmer 50. The fining agent(s) react with the molten glass to release fining gases into the undercurrent 62 and the portion of the molten glass bath downstream of the skimmer 50. These fining gases remove the gas bubbles 88 that pass through the submerged passageway 60 by accelerating the ascension of the gas bubbles 88 or causing the gas within the bubbles 88 to dissolve into the glass matrix of the molten glass bath 22. In that regard, the skimmer 50 may be used to separate the entrained gas bubbles 88 introduced into the molten glass bath 22 as discussed above to ensure that most of the gas bubbles 88 that pass beneath the skimmer 50 are smaller gas bubbles having a diameter of 0.7 mm or less or, more preferably, 0.5 mm or less. As a result, the density of the molten glass bath 22 increases along the flow direction F of the glass bath 22, and the amount of the fining agent(s) introduced into the molten glass bath 22 may be limited to what is needed to effectively remove the smaller gas bubbles that pass beneath the skimmer 50.

Figure 12:
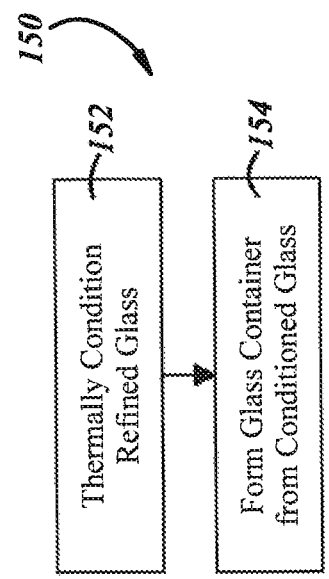
FIG. 12 is a flow diagram of a process for forming glass containers from the output molten glass discharged from the fining vessel according to one embodiment of the present disclosure.

The output molten glass 16 is removed from the outlet 26 of the fining vessel 10 and has a second density and a second concentration of entrained gas bubbles. The second density of the output molten glass 16 is greater than the first density of the input molten glass 12, and the second concentration of entrained gas bubbles of the output molten glass 16 is less than the first concentration of entrained gas bubbles of the input molten glass 12. For instance, the output molten glass 16 may have a density of 2.3 $gm/cm^3$ to 2.5 $gm/cm^3$ and a concentration of entrained gas bubbles ranging from 0 vol % to 1 vol % or, more narrowly, from 0 vol % to 0.05 vol %, for soda-lime-silica glass. The output molten glass 16 may then be further processed into a glass article such as a glass container. To that end, the output molten glass 16 delivered from the outlet 26 of the fining vessel 10 may have a soda-lime-silica glass chemical composition as dictated by the formulation of the vitrifiable feed material 96, and a preferred process 150 for forming glass containers from the output molten glass 16 includes a thermal conditioning step 152 and a glass article forming step 154, as illustrated in FIG. 12.

In the thermal conditioning step 152, the output molten glass 16 delivered from the fining vessel 10 is thermally conditioned. This involves cooling the output molten glass 16 at a controlled rate to achieve a glass viscosity suitable for glass forming operations while also achieving a more uniform temperature profile within the output molten glass 16. The output molten glass 16 is preferably cooled to a temperature between 1000° C. and 1200° C. to provide conditioned molten glass. The thermal conditioning of the output molten glass 16 may be performed in a separate forehearth that receives the output molten glass 16 from the outlet 26 of the fining vessel 10. A forehearth is an elongated structure that defines an extended channel along which overhead and/or sidewall mounted burners can consistently and smoothly reduce the temperature of the flowing molten glass. In another embodiment, however, the thermal conditioning of the output molten glass 16 may be performed within the fining vessel 10 at the same time the molten glass bath 22 is being fined. That is, the fining and thermal conditioning steps may be performed simultaneously such that the output molten glass 16 is already thermally conditioned upon exiting the fining vessel 10.

Glass containers are formed from the conditioned molten glass in the glass article forming step 154. In some standard container-forming processes, the conditioned molten glass is discharged from the spout 38 at the end of the fining vessel 10 or a similar device at the end of a forehearth as molten glass streams or runners. The molten glass runners are then sheared into individual gobs of a predetermined weight. Each gob is delivered via a gob delivery system into a blank mold of a glass container forming machine. In other glass container forming processes, however, molten glass is streamed directly from the outlet 26 of the fining vessel 10 or an outlet of the forehearth into the blank mold to fill the mold with glass. Once in the blank mold, and with its temperature still between 1000° C. and 1200° C., the molten glass gob is pressed or blown into a parison or preform that includes a tubular wall. The parison is then transferred from the blank mold into a blow mold of the glass container forming machine for final shaping into a container. Once the parison is received in the blow mold, the blow mold is closed and the parison is rapidly outwardly blown into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The final container formed within the blow mold has an axially closed base and a circumferential wall. The circumferential wall extends from the axially closed base to a mouth that defines an opening to a containment space defined by the axially closed base and the circumferential wall. The glass container is allowed to cool while in contact with the mold walls of the blow mold and is then removed from the blow mold and placed on a conveyor or other transport device. The glass container is then reheated and cooled at a controlled rate in an annealing lehr to relax thermally-induced constraints and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass chemical composition, which typically lies within the range of 470° C. to 500° C. The glass container may be cooled rapidly after it has been cooled to a temperature below the strain point. Any of a variety of coatings may be applied to the surface of the glass container either before (hot-end coatings) or after (cold-end coatings) annealing for a variety of reasons.

Figure 7:
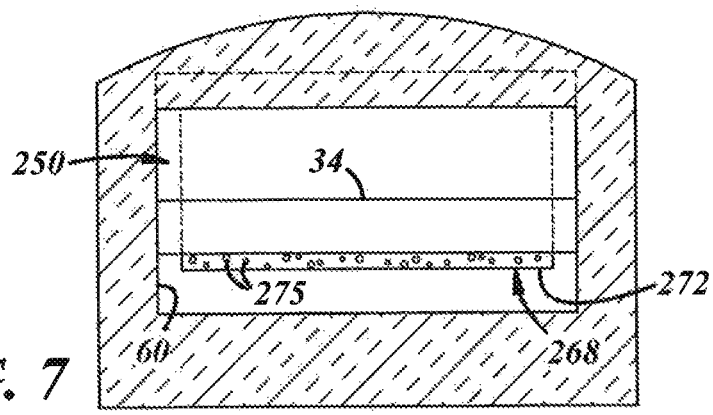
FIG. 7 is a cross-sectional view of the fining vessel taken from the same perspective as that of FIG. 6 showing the skimmer according to another embodiment of the present disclosure.
Figure 8:
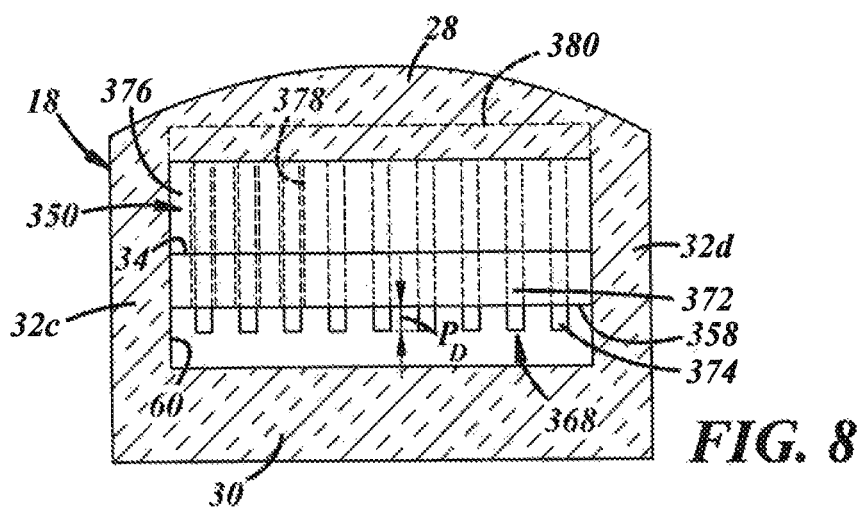
FIG. 8 is a cross-sectional view of the fining vessel taken from the same perspective as that of FIG. 6 showing the skimmer according to yet another embodiment of the present disclosure.
Figure 9:
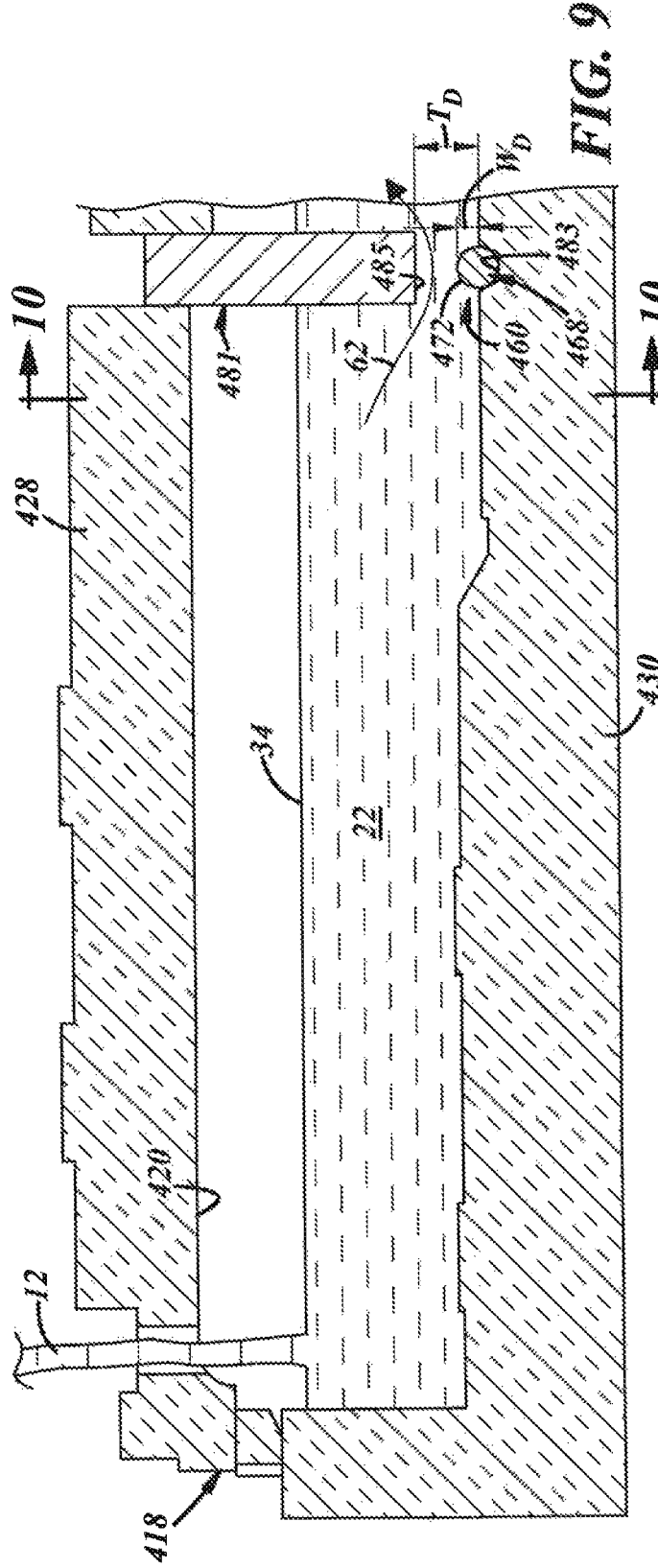
FIG. 9 is a magnified elevated cross-sectional view of a skimmer positioned within the fining vessel illustrated in FIG. 3 according to still another embodiment of the present disclosure.

The glass melting, fining, and glass article forming processes described above are subject to variations without detracting from their purposes or objectives. Several such variations are depicted in FIGS. 7-9 in which like reference numerals are used to identify corresponding features of the previously-described embodiments. In the discussions below, only the material differences of the relevant embodiment are discussed compared to the previously-described embodiments with the understanding that the descriptions of the various features of the previously-described embodiments are equally applicable unless stated otherwise. Referring now to FIG. 7, in one alternate embodiment, the dissolvable fining material component 268 supported within the skimmer 250 may be a perforated plate 272, as opposed to a solid plate, in that the plate 272 defines a plurality of openings 275 that fully traverse the thickness of the plate 272. In this way, the undercurrent 62 of the molten glass bath 22 may flow both through and around the dissolvable fining material plate 272 to facilitate more intimate exposure between the plate 272 and the undercurrent 62. Because the undercurrent 62 of the molten glass bath 22 flows both through and around the plate 272, the fining agent(s) may be released more uniformly into the undercurrent 62.

In another alternate embodiment, as shown in FIG. 8, the dissolvable fining material component 368 may be in the form of a rod 372 as opposed to a plate 72, 272. Multiple dissolvable fining material rods 372 may be employed together. To that end, the skimmer 350 includes a main body 376 that defines a plurality of bores 378. Each bore 378 traverses the skimmer 350 along the height $S_H$ of the skimmer 350 and is open at the distal free end 358 and the opposed upper end 380 of the skimmer 350. Each of the bores 378 supports a dissolvable fining material rod 372. The rods 372 are movable relative to the main body 376 along the height $S_H$ of the skimmer 350 in the same way as the dissolvable fining material plates 72, 272—that is, to maintain an exposed portion 374 of the rods 372 at the desired distance $P_D$ beyond the distal free end 358 of the skimmer 350 as the rods disintegrate over time. And, much like the perforated plate 272 of the embodiment illustrated in FIG. 7, the use of multiple dissolvable material rods 372 allows the undercurrent 62 of the molten glass bath 22 to flow through and around the rods 372, thus facilitating the release of the fining agent(s) from the rods 372 more uniformly into the undercurrent 62.

Figure 10:
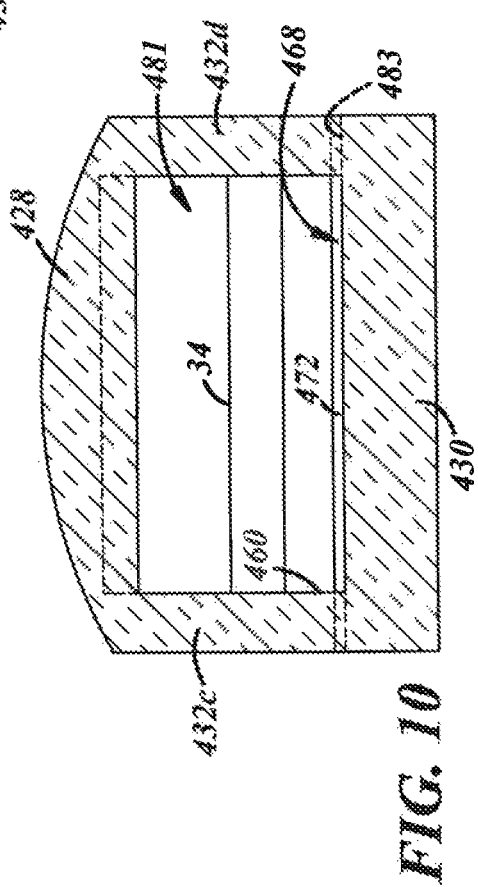
FIG. 10 is a cross-sectional view of the fining vessel taken along section lines 10-10 in FIG. 9.

In still another alternate embodiment, the dissolvable fining material component 468 may be supported within the housing 418 of the fining vessel 10, as depicted in FIGS. 9-10. In this scenario, a skimmer 481 formed of a refractory material may extend downwardly from the roof 428 of the housing 418 and between the sidewalls 432c, 432d of the housing 418 to define, as before, the submerged passageway 460 along with corresponding portions of the floor 430 and sidewalls 432c, 432d. A channel 483 that extends across the fining chamber 420 and between the sidewalls 432c, 432d of the upstanding wall 432, and therefore runs along the width $S_W$ of the skimmer 481, is defined in the floor 430 directly beneath the skimmer 481. A dissolvable fining material rod 472 is received in the channel 483 and rises above the floor 430 a distance $W_D$ that is less than the distance $T_D$ between a distal free end 485 of the skimmer 481 and the floor 430 of the housing 418. And, similar to the other embodiments, the fining material rod 472 is selectively and directly exposed to the undercurrent 62 of the molten glass bath 22 that passes through the submerged passageway 460 beneath the skimmer 481. Fining agent(s) are released into the undercurrent 62 to target the gas bubbles, which may comprise mostly smaller gas bubbles, in the same way as before, albeit from the floor 430 of the housing 418. The fining material rod 472 described here may also, if desired, be used in conjunction with the skimmers 50, 250, 350 disclosed in the previous embodiments as a way to increase the exposure of the undercurrent 62 to the fining agent(s).

Figure 3:
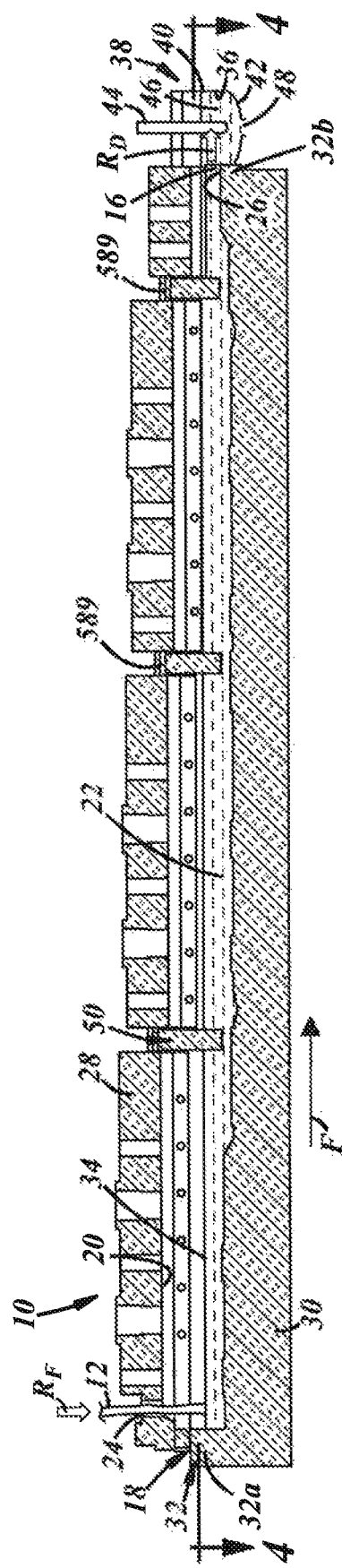
FIG. 3 is an elevated cross-sectional illustration of the fining vessel depicted in FIG. 1 according to one embodiment of the present disclosure.
Figure 4:
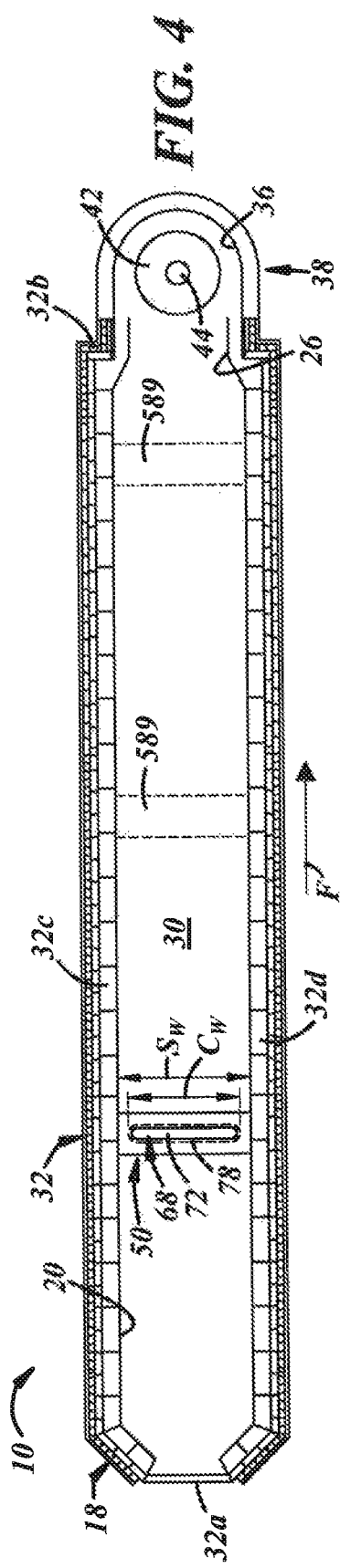
FIG. 4 is a cross-sectional plan view of the fining vessel depicted in FIG. 3 and taken along section line 4-4.

In yet another alternate embodiment, additional skimmers 589, which are shown in FIGS. 3-4, may be included in the fining vessel 10 downstream of the skimmer 50, 250, 350 described above. Each of the additional downstream skimmers 589 may individually have the same structure as any of the skimmers 50, 250, 350 described above that support a dissolvable fining material component 68, 268, 368 or it may have the same structure as the skimmer 481 that does not support a dissolvable fining material component. If additional skimmers 589 are included in the fining vessel 10, in many instances the number of additional skimmers 589 may be somewhere between one and three.

There thus has been disclosed a method of fining glass that satisfies one or more of the objects and aims previously set forth. After being fined, the molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of fining glass, the method comprising:
supplying input molten glass into a fining chamber of a fining vessel, the input molten glass combining with a molten glass bath contained within the fining chamber and introducing entrained gas bubbles into the molten glass bath, the input molten glass having a density and a concentration of gas bubbles;
flowing the molten glass bath through the fining chamber in a flow direction, the molten glass bath having an undercurrent that flows beneath a skimmer, which is partially submerged in the molten glass bath, and through a submerged passageway defined in part by the skimmer; and
introducing one or more fining agents into the undercurrent of the molten glass bath directly beneath the skimmer from a dissolvable fining material component.

2. The method set forth in claim 1, wherein introducing one or more fining agents into the undercurrent of the molten glass bath comprises releasing one or more fining agents from the dissolvable fining material component, the dissolvable fining material component being supported within the skimmer and having an exposed portion that protrudes beyond a distal free end of the skimmer into the submerged passageway.

3. The method set forth in claim 2, wherein the dissolvable fining material component is in the form of a plate that is moveable within an internal cavity defined in a main body of the skimmer.

4. The method set forth in claim 3, wherein the plate is perforated to allow the undercurrent of the molten glass bath to flow through openings defined in the exposed portion of the plate.

5. The method set forth in claim 2, wherein the dissolvable fining material component is in the form of a rod movable within a bore defined in a main body of the skimmer.

6. The method set forth in claim 2, further comprising:
advancing the dissolvable fining material component relative to a main body of the skimmer along a height of the skimmer to maintain the exposed portion of the component as the component disintegrates in the undercurrent of the molten glass bath.

7. The method set forth in claim 1, wherein the fining vessel includes a housing that defines the fining chamber, the housing comprising a floor, and wherein introducing one or more fining agents into the undercurrent of the molten glass bath comprises releasing one or more fining agents from the dissolvable fining material component, the dissolvable fining material component being supported in the floor of the housing directly beneath the skimmer and rising above the floor into the submerged passageway.

8. The method set forth in claim 7, wherein the floor defines a channel extending across the fining chamber beneath the skimmer, and wherein the dissolvable fining material component is in the form of a rod and is received within the channel defined in the floor of the housing.

9. The method set forth in claim 1, wherein the one or more fining agents that are introduced into the undercurrent of the molten glass bath include a sulfate that decomposes to release $O_2$ and $SO_2$.

10. The method set forth in claim 1, wherein the one or more fining agents that are introduced into the undercurrent of the molten glass bath include sodium sulfate, $Cr_2O_3$, $WO_3$, carbon, aluminum, a carbonate, silicon carbide (SiC), an oxidized metal powder, or a combination thereof.

11. The method set forth in claim 1, wherein the input molten glass has a soda-lime-silica glass chemical composition.

12. The method set forth in claim 1, further comprising:
discharging output molten glass from the fining vessel, the output molten glass having a density that is greater than the density of the input molten glass and further having a concentration of gas bubbles that is less than the concentration of gas bubbles of the input molten glass.

13. The method set forth in claim 1, wherein the dissolvable fining material component is a solid that disintegrates over time to introduce the one or more fining agents.

14. The method set forth in claim 1, wherein the dissolvable fining material component comprises a mixture of a glass compatible base material and one or more fining agents.

15. A method of fining glass, the method comprising:
supplying input molten glass into a fining chamber of a fining vessel, the input molten glass combining with a molten glass bath contained within the fining chamber and introducing entrained gas bubbles into the molten glass bath, the input molten glass having a density and a concentration of gas bubbles;
flowing the molten glass bath through the fining chamber in a flow direction, the molten glass bath having an undercurrent that flows beneath a skimmer, which is partially submerged in the molten glass bath, and through a submerged passageway defined in part by the skimmer; and
introducing one or more fining agents into the undercurrent of the molten glass bath directly beneath the skimmer from a dissolvable fining material component that releases the one or more fining agents, the dissolvable fining material component being supported within the skimmer and having an exposed portion that protrudes beyond a distal free end of the skimmer into the submerged passageway.

16. The method set forth in claim 15, wherein the dissolvable fining material component is in the form of a plate that is moveable within an internal cavity defined in a main body of the skimmer.

17. The method set forth in claim 16, wherein the plate is perforated to allow the undercurrent of the molten glass bath to flow through openings defined in the exposed portion of the plate.

18. The method set forth in claim 15, wherein the dissolvable fining material component is in the form of a rod movable within a bore defined in a main body of the skimmer.

19. The method set forth in claim 15, further comprising:
advancing the dissolvable fining material component relative to a main body of the skimmer along a height of the skimmer to maintain the exposed portion of the component as the component disintegrates in the undercurrent of the molten glass bath.

20. The method set forth in claim 15, wherein the one or more fining agents that are introduced into the undercurrent of the molten glass bath include a sulfate that decomposes to release $O_2$ and $SO_2$.

21. The method set forth in claim 15, wherein the one or more fining agents that are introduced into the undercurrent of the molten glass bath include sodium sulfate, $Cr_2O_3$, $WO_3$, carbon, aluminum, a carbonate, silicon carbide (SiC), an oxidized metal powder, or a combination thereof.

22. The method set forth in claim 15, wherein the input molten glass has a soda-lime-silica glass chemical composition.

23. The method set forth in claim 15, further comprising:
discharging output molten glass from the fining vessel, the output molten glass having a density that is greater than the density of the input molten glass and further having a concentration of gas bubbles that is less than the concentration of gas bubbles of the input molten glass.

24. The method set forth in claim 15, wherein the dissolvable fining material component comprises a mixture of a glass compatible base material and one or more fining agents.

25. A method of fining glass, the method comprising:
supplying input molten glass into a fining chamber of a fining vessel, the input molten glass combining with a molten glass bath contained within the fining chamber and introducing entrained gas bubbles into the molten glass bath, the input molten glass having a density and a concentration of gas bubbles;
flowing the molten glass bath through the fining chamber in a flow direction, the molten glass bath having an undercurrent that flows beneath a skimmer, which is partially submerged in the molten glass bath, and through a submerged passageway defined in part by the skimmer;
introducing one or more fining agents into the undercurrent of the molten glass bath directly beneath the skimmer from a dissolvable fining material component that releases the one or more fining agents;
wherein the fining vessel includes a housing that defines the fining chamber, the housing comprising a floor, wherein the floor defines a channel extending across the fining chamber beneath the skimmer, and wherein the dissolvable fining material component is in the form of a rod that is received within the channel defined in the floor of the housing and that rises above the floor into the submerged passageway.

26. The method set forth in claim 25, wherein the dissolvable fining material component comprises a mixture of a glass compatible base material and one or more fining agents.

* * * * *